Aug. 17, 1965  J. B. OTTESTAD  3,200,715
PISTON ASSEMBLIES
Filed April 13, 1964
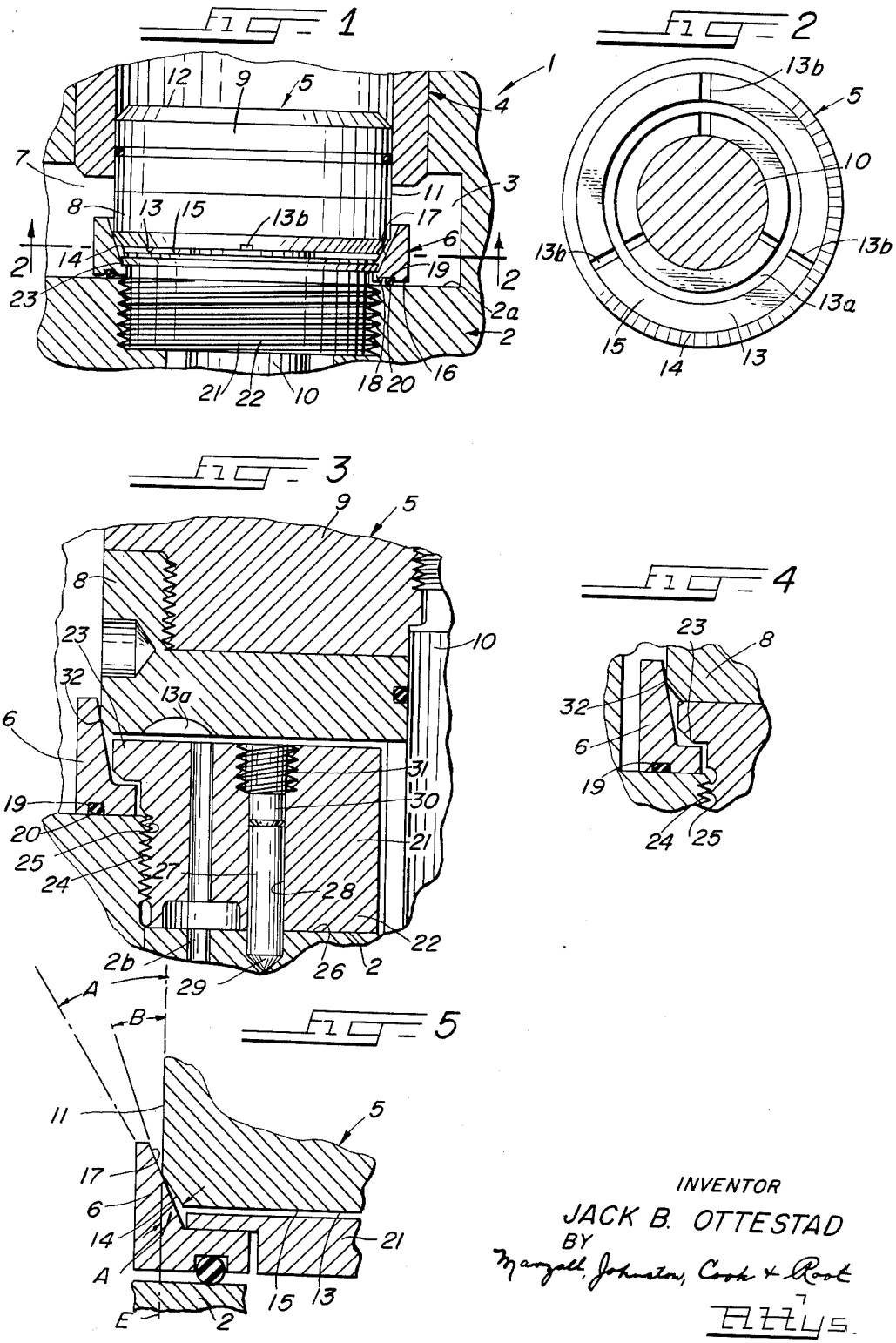
INVENTOR
JACK B. OTTESTAD

United States Patent Office 3,200,715
Patented Aug. 17, 1965

3,200,715
PISTON ASSEMBLIES
Jack B. Ottestad, La Jolla, Calif., assignor to U.S. Industries, Inc., New York, N.Y., a corporation of Delaware
Filed Apr. 13, 1964, Ser. No. 359,238
19 Claims. (Cl. 91—392)

This invention relates to piston assemblies and, more particularly, to piston assemblies which are particularly well adapted for use in high pressure units such as, for example, in high energy impact machines, and the like.

The primary object of the present invention is to afford a novel seal for pistons, and the like.

In certain power units such as, for example, in high energy impact machines of the type shown in the co-pending application for United States Letters Patent, Serial No. 190,524, now Patent No. 3,135,140, filed in the United States Patent Office on April 19, 1962, in the names of Jack B. Ottestad and Samuel A. Skeen, as co-inventors, wherein pistons are used to drive portions of the machines, it is often desirable to effectively seal an end of such a piston, at one end of the stroke thereof, against exposure to high pressure working fluid which surrounds the pistons. It is an important object of the present invention to enable the ends of such pistons to be so sealed in a novel and expeditious manner.

Seals for sealing the ends of pistons in high energy impact machines, and the like, are disclosed in the aforementioned co-pending application, Serial No. 190,524, and in the co-pending application for United States Letters Patent, Serial No. 216,428, filed in the United States Patent Office on August 13, 1962, in the names of Jack B. Ottestad and Samuel A. Skeen, as co-inventors. While the seals shown in said applications are practical and effective, it is an object of the present invention to afford novel improvements thereover.

Another object is to afford a novel seal of the aforementioned type wherein a piston is sealingly engaged with a sealing ring in a novel and expeditious manner, when the aforementioned sealing of the piston is effected.

Yet another object of the present invention is to insure against overstressing of such a sealing ring in such sealing of a piston.

A further object is to limit, in a novel and expeditious manner, the stress to which such a sealing ring is subjected irrespective of the force applied to the piston urging it toward sealing engagement with said ring.

Another object of the present invention is to afford a novel seal of the aforementioned type wherein the sealing ring portion thereof is removably mounted in operative position in a novel and expeditious manner.

A further object is to afford a novel seal of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary longitudinal sectional view of a piston assembly in a power unit embodying the principles of the present invention;

FIG. 2 is a sectional view of the piston taken substantially along the ling 2—2 in FIG. 1;

FIG. 3 is an enlarged fragmentary sectional view of a portion of the piston assembly shown in FIG. 1, showing the parts thereof disposed in different operative position;

FIG. 4 is another enlarged fragmentary sectional view of a portion of the piston assembly shown in FIG. 1, showing parts thereof disposed in a different operative position; and FIG. 5 is a somewhat diagrammatic, fragmentary sectional view of a portion of the piston assembly shown in FIG. 3.

A portion of a power unit 1, embodying the principles of the present invention is shown in the drawings to illustrate the preferred form of the present invention. The power unit 1 may be any suitable type of power unit such as, for example, a power unit embodied in a high energy impact machine of the general type shown in the aforementioned co-pending application, Serial No. 190,524. The power unit 1 includes, in general, a supporting member 2, having a pressure chamber 3 therein; a cylinder 4, having one end opening into the pressure chamber 3; a piston 5 reciprocably mounted in the cylinder 4; and a sealing ring 6 mounted in the supporting member 2 in position to sealingly engage the piston 5 at one end of the stroke of the piston 5 in the cylinder 4, as will be discussed in greater detail presently.

The supporting member 2 may be any suitable type of supporting member such as, for example, a movable plate or die head embodied in a high energy impact machine of the type shown in the aforementioned application, Serial No. 190,524. In such machines, working fluid, such as, for example, a suitable gas, is fed into the pressure chamber 3 through a suitable passageway, such as, for example, a passageway 7, FIG. 1.

The pressure of such gases in the chamber 3 are commonly relatively high, such as, for example, in the nature of two thousand pounds per square inch, and in the operation of such a power unit the high pressure gas in the chamber 3 is utilized to provide an acceleration force to accelerate the piston 5 upwardly in the cylinder 4, as viewed in FIG. 1, while, at the same time, the pressurized gas in the chamber 3 provides an equal acceleration force acting in the opposite direction to accelerate the cylinder 4 and the supporting member 2 in a downward direction as viewed in FIG. 1.

Subsequently, in the operation of the power unit 1, after the piston 5 has completed its upward stroke, it is forced downwardly relative to the cylinder 4 and the supporting member 2 into position wherein the lower end portion 8 thereof projects downwardly into the chamber 3 and is disposed in sealed engagement with the sealing ring 6, as will be discussed in greater detail presently.

The lower end portion 8 of the piston 5 is threaded onto the upper portion 9 thereof. In the power unit 1 shown in the drawings, the piston 5 is threaded onto the upper end portion of an elongated, substantially straight mounting post or connecting rod 10 which projects downwardly therefrom in axial alignment therewith. With this construction, the lower end portion 8 of the piston 5 may be made of particularly hard material, such as, for example, case-hardened steel, or the like, and the upper end portion 9 and the connecting rod 10 may be made of softer material, such as, for example, aluminum, or the like.

The piston 5 is circular in transverse cross-section and includes a cylindrical-shaped side wall portion 11, an upper face 12, and a lower face 13. The lower face 13 includes an annular outer peripheral edge portion 14, which projects inwardly from the side wall portion 11, and an inner portion 15, which extends inwardly from the annular portion 14. The outer peripheral edge portion 14 preferably projects inwardly from the side wall portion 11 at an acute angle A to a straight-line lower extension E of the side wall portion 11, as shown in FIG. 5. The intermediate portion 15 of the bottom face 13 is preferably disposed in a plane perpendicular to the side wall portion 11.

The sealing ring 6 may be made of any suitable hard material, such as, for example, steel, and includes a bottom face 16 and an upwardly and outwardly sloping, substantially frusto-conical shaped inner face 17, the inner face 17 sloping upwardly and outwardly away from an annular, radially inwardly projecting flange 18 at the bottom of the ring 6. The bottom face 16 of the sealing ring 6 has an annular groove or recess 19 extending therearound, and a resilient annular sealing ring 20, made of suitable material, such as, for example, rubber, neoprene, or the like, is mounted in the groove 19 and normally projects downwardly from the lower face 16, FIG. 1.

An annular retainer ring 21 is mounted in the supporting member 2 in position to hold the sealing ring 6 in operative position thereof on the portion 2a of the supporting member 2 defining the bottom of the chamber 3. The retainer ring 21 may also be made of any suitable material, such as steel, and includes an annular main body portion 22 and an annular flange 23 projecting radially outwardly from the upper end portion of the main body portion 22. The main body portion 22 has external threads 24 formed thereon below the flange 23, and is threaded into a recess 25 in the supporting member 22 around the connecting rod 10, FIG. 3.

When the sealing ring 6 and the retaining ring 21 are disposed in assembled position on the supporting member 2 the body portion 22 of the retainer ring 21 projects downwardly through the sealing ring 6 into the opening 25 in the supporting member 2, and the flange 23 on the retainer ring 21 is disposed in overlying relation to the flange 18 on the sealing ring 6.

The retainer ring 21 is preferably of such diameter that when it is disposed in centered relation to the sealing ring 6 it is spaced inwardly from adjacent radially outwardly disposed portions of the sealing ring 6. Similarly, the flange 23 of the retainer ring 21 is preferably disposed such a distance from the lower end thereof that when the retainer ring 21 is disposed in operative position in the opening 25 with the lower end of the retainer ring 21 disposed in abutting engagement with the bottom 26 of the recess 25, and the sealing ring 6 is disposed in position wherein the lower face 16 thereof is disposed in abutting engagement with the portion 2a of the supporting member 2, the flange 18 is spaced downwardly from the flange 23, as shown in FIG. 3. With this construction, the sealing ring 6 and the retainer ring 21 are so constituted and arranged relative to each other in assembled relation that the sealing ring 6 may shift radially relative to the retainer ring 21 during entry of the piston thereinto, to accommodate minor deflections in the movement of the piston 5 or deformities in the periphery thereof. The flange 23 is of such outside diameter, and the flange 18 is of such inside diameter, that they remain in overlapped relation to each other throughout their circumferences in all radially shifted positions of the sealing ring 6 relative to the retainer ring 21.

When the retainer ring 21 is disposed in operative position on the supporting member 2, it is preferably held against rotation relative thereto by a pin 27 removably mounted in an opening 28 which extends downwardly through the retainer ring 21, the lower end portion of the pin 27 extending into an opening 29 in the supporting member 2. A pad or plug 30 of suitable resilient material such as, for example, nylon, is mounted in the opening 28 on top of the pin 27, and a set screw or threaded plug 31 is threaded into the upper portion of the opening 28 into firm abutting engagement with the pad 30 to thereby firmly clamp the pin 27 in operative position in the recess 29. The threads on the outer periphery of the plug 31 are preferably pipe threads, which are effective to firmly hold the plug 31 against accidental loosening in the opening 28.

In the power unit 1, the sealing ring 6 is disposed on the supporting member 2 in circumscribing relation to the longitudinal axis of the piston 5 and the connecting rod 10. It is so disposed relative to the lower end of the downward stroke of the piston 5 that when the piston 5 approaches the lowermost end of its downward stroke, the annular corner portion 32 thereof, along which the annular outer peripheral edge portion of the face 13 is connected to the side wall portion 11, moves into initial sealing engagement with the inner face 17 of the sealing ring 6, as shown in FIG. 1. At this time, the sealing ring 6 is normally held in upwardly spaced relation to the portion 2a of the supporting member 2 by the sealing ring 20 disposed in the lower face 16 thereof.

After this initial sealing engagement of the piston 5 with the sealing ring 6, continued downward movement of the piston 5 is effective to compress the sealing ring 20 and move the sealing ring 6 downwardly into position wherein the lower face 16 thereof is disposed in abutting engagement with the portion 2a of the supporting member 2, as shown in FIG. 3. The sealing ring 6 and the piston 5 are of such size, and are so constituted and arranged relative to each other, that, at this time, the lower face 13 of the piston 5 is disposed in upwardly spaced relation to the retainer ring 21, as shown in FIG. 3.

Thereafter, further downward movement of the piston 5 is effective to move the corner portion 32 downwardly along the inner face 17 of the sealing ring 6 until the lower face 13 of the piston 5 is disposed in abutting engagement with the retainer ring 21, this constituting the lowermost position of the piston 5 and the lower end of the downward stroke thereof. This latter downward movement of the corner portion 32 of the piston 5 along the inner face 17 of the sealing ring 6 stresses and deflects the sealing ring 6 outwardly, and insures close fitting, sealing engagement between the corner portion 32 and the inner face 17. The engagement of the lower face 13 of the piston 5 with the retainer ring 21 stops further downward movement of the piston 5 and thereby prevents further stressing of the sealing ring 6.

When the piston 5 is disposed in its lowermost position it is in its normal "at-rest" position in the cylinder 4 which it assumes when the power unit 1 is ready to be fired. Under these conditions, the pressure in the cylinder 4 pressing downwardly on the piston 5 is effective to hold the piston 5 in sealed engagement with the sealing ring 6, the high pressure gas under the piston 5 having been exhausted from the chamber 3 by suitable means such as a passageway 2b through the retainer ring 21 and the supporting member 2, FIG. 3.

To facilitate exhausting of the gases from between the piston 5 and the portion 2a of the supporting member 2 during movement of the piston 5 into its lowermost position, and to facilitate the feeding of gases into the chamber 3 between the piston 5 and the portion 2a of the supporting member 2 when the power unit 1 is to be fired, an annular recess 13a, which is concentric to the peripheral outer edge portion 14, is afforded in the lower face 13 of the piston 5, and three elongated, substantially straight, equally spaced recesses 13b extend radially between the connecting rod 10 and the outer peripheral edge portion 14, FIG. 2. The recesses 13b terminate in inwardly spaced relation to the outer periphery of the peripheral edge portion 14 so as not to interrupt the continuous annular corner portion 32. The recess 13a is so disposed in the piston 5 that it is always directly over the upper end of the passageway 2b.

With this construction, as the piston 5 moves downwardly into its lowermost position, the gas trapped therebelow may readily escape therefrom into the recess 13a from which it may pass through the passageway 2b to the atmosphere or to a suitable storage receptacle, not shown. Also, with this construction, if, after the piston 5 is disposed in lowermost position, there should be any leakage between the corner portion 32 and the sealing ring 6 prior to firing of the power unit 1, the leaking gas may pass from under the peripheral edge portion 14 radially inwardly through the recesses 13b into the recess 13a, from which it may be discharged through the passageway 2b and thus prevent a dangerous build up of pressure beneath the piston 5, which might cause a premature triggering of the power unit 1. In addition, the recesses 13a and 13b insure the ready flow of high pressure gas from a suitable passageway, such as the passageway 2b, under the various positions of the piston 5 during triggering or firing of the power unit 1.

It will be appreciated by those skilled in the art that the recesses 13a and 13b are shown as disposed in the lower face of the piston 10 merely by way of illustration and not by way of limitation, and that either the recess 13a or the recesses 13b, or both, if desired, may be formed in the upper face of the retainer ring 21 without departing from the purview of the present invention.

With the inner face 17 of the sealing ring 6 sloping outwardly at an acute angle to the side wall portion 11 of the piston 5, and with the outer peripheral edge portion 14 of the bottom face 13 of the piston 5 sloping inwardly from the side wall portion 11, as shown in FIGS. 1, 3, and 4, thin-line, substantially edge contact between the corner portion 32 of the piston 5 and the inner surface 17 of the sealing ring 6 is afforded from the moment the corner portion 32 first engages the sealing ring 6, as shown in FIG. 1, until the piston 5 has entered the sealing ring 6 into its final, at-rest position as shown in FIG. 4. Thus, the initial contact between the corner portion 32 and the sealing ring 6 affords an effective annular seal, which no doubt could be relied upon to seal against leakage from the chamber 3 between the piston 5 and the sealing ring 6 at lower gas pressures within the chambers 3. However, the further movement of the piston 5 from this initial sealing position into its final position, as shown in FIG. 4, affords a tight, wedged-type, sealing engagement between the piston 5 and the sealing ring 6 which is highly effective against much higher pressures, such as, for example, the aforementioned pressures of two thousand pounds per square inch, and more, encountered in power units such as the aforementioned high energy rate impact machines, and the like. Also, by constructing the power unit 1 in accordance with the principles of the present invention, such effective sealing between the piston 5 and the sealing ring 6 may be afforded without producing excessive wear on the sealing ring 6 or the piston 5, and without over-stressing the sealing ring 6 irrespective of the force with which the piston 5 is held in sealing engagement with the ring 6.

In power units of the general type involved herein, wherein the pressures in the pressure chamber 3, or the like, are relatively high, it is important that the seal afforded for the piston 5 be highly effective and efficient. However, it is also important, as a practical matter, that the wear between the engaging parts of the seal be at a minimum so as to eliminate unnecessary repair or replacement thereof. In addition, in such power units, the piston being sealed is often urged by a substantially great force toward sealing engagement with the sealing ring 6, or the like, and it is highly important that the sealing member be effectively protected against over-stressing so as to prevent failure thereof. The present invention accomplishes all of these purposes in a novel and expeditious manner.

In accordance with the principles of the present invention, the angle B, FIG. 5, between the inner face 17 of the sealing ring 6 and the side wall portion 11 of the piston 5 is an acute angle and preferably should be a relatively small acute angle, such as an angle of from three degrees to thirty degrees. With this construction, a substantial distance of entry of the piston 5 into the sealing ring 6 may be afforded without overstressing the sealing ring 6. The term "distance of entry" is used herein as meaning the distance that the piston 5 moves axially downwardly along the inner face 17 of the sealing ring 6 from its initial solid sealing engagement, shown in FIG. 1, to its final sealing position, shown in FIG. 4, wherein the piston 5 has moved downwardly into the ring 6 into abutting engagement with the retainer ring 21. Normally, the piston 5 will not move downwardly along the inner face 17 of the sealing ring 6 from its initial sealing engagement therewith toward its final sealing engagement therewith, until the O-ring 20 has been fully compressed and the lower face 16 of the sealing ring 6 rests directly on the portion 2a of the supporting member 2.

When everything involved in the seal afforded by the piston 5 and the sealing ring 6 remains the same except the size of the acute angle B of the inner face 17, FIG. 5, the distance of entry of the piston 5 varies inversely with the tangent of the angle B. Thus, for example, in a seal wherein: the ring 6 is made of a material such as steel having a Young's modulus of $30 \times 10^6$ pounds per square inch; the prescribed working stress for the sealing ring 6 is 50,000 pounds per square inch; and the diameter of the piston 5 is 10 inches; and the angle B is 15 degrees, the distance of entry is .031 inch. On the other hand, if all of the aforementioned factors remain the same except that the angle B is changed to 10 degrees, the distance of entry is .047 inch. Under the same conditions, if the angle B is 20 degrees, the distance of entry is .023 inch.

However, if all of the aforementioned factors, including the angle B, remain the same, except the diameter of the piston 5, the distance of entry of the piston 5 varies in direct proportion to the diameter of the piston 5. Thus, for example, if all of the factors of the first above set forth example remain the same except that the diameter of the piston is increased from 10 inches to 20 inches, the distance of entry is .062 inch, rather that the .031 inch of the first example.

Thus, it will be seen that, as illustrated above, as the angle B decreases, the distance of entry increases, all other conditions remaining the same; and as the angle B increases, the distance of entry decreases, under the same conditions. The wedging and scraping action between the piston 5 and the inner face 17 of the sealing ring 6 when the distance of entry is substantial tends to insure an effective, highly efficient seal between the piston 5 and the sealing ring 6 which is not destroyed by foreign particles, which normally may be expected to accidently get into the seal, such as, for example, particles of dust or dirt getting on the inner face 17 of the sealing ring 6. However, it will be remembered that in accordance with the principles of the present invention, it is desired to maintain a substantially fine line contact between the piston 5 and the sealing ring 6. When the angle B becomes too small, the desired fine line contact between the corner portion 32 and the sealing ring 6 tends to change to a broader surface contact, which affords a less desirable, and less effective sealing engagement between the piston 5 and the sealing ring 6.

Therefore, in constructing a piston assembly in accordance with the principles of the present invention, the angle B should not be less than 3 degrees, and should not be greater than an angle which will afford a minimum distance of entry of .02 inches.

When the angle A, FIG. 5, between the side wall portion 11 and the outer peripheral edge portion 14 of the lower face 13 of the piston 5 is 90 degrees or greater, the edge afforded by the corner portion 32 is sufficiently sharp that it acts as an effective scraper which tends to gouge and dig into the inner face 17 of the sealing ring 6 during the movement of the piston 5 along its distance of entry. This tends to excessively wear the sealing ring 6 and drastically shorten the expected working life of the sealing ring 6 over that which is afforded when the piston 5 is constructed in accordance with the principles of the present invention, wherein the outer peripheral edge portion 14 is disposed at an acute angle A. However, if the acute angle A becomes too small, the outer peripheral edge portion 14 of the bottom face 13 of the piston 5 tends to engage the inner face 17 of the sealing ring 6 with a surface contact, rather than the aforementioned line contact during movement of the piston 5 along its distance of entry.

In accordance with the principles of the present invention, the acute angle A should not be less than one-half degree greater than the acute angle B, and preferably should be within the range of not less than one-half degree greater, and not more than ten degrees greater, than the angle B. With this construction a seal is provided which affords good sealing characteristics and a long-wearing seal life for power units of the aforementioned type.

From the foregoing, it will be seen that the present invention affords a novel seal, which is effective to efficiently withstand the high pressures of high energy impact machines, and the like, and which is not destroyed by the entry of foreign particles of matter, such as, for example, dust particles, and dirt particles of the type which, as a practical matter, normally may be expected to creep into the seal from time to time during operation of such a machine.

Also, it will be seen that the present invention affords a novel seal wherein the piston 5 engages the sealing ring 6 with an effective thin line contact, but the sealing ring 6, when in final sealing engagement with the piston 5 is effectively protected by the engagement of the lower face 13 of the piston 5 with the retainer ring 21 against overstressing irrespective of the force acting on the piston 5 and urging it toward the supporting member 2.

In addition, it will be seen that the present invention affords a novel piston assembly which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. In a power unit
 (a) a cylinder
 (b) a piston reciprocable in said cylinder through a predetermined stroke,
 (c) said piston having two end portions
 (d) an annular sealing ring in one end of said cylinder, and
 (e) abutment means within said ring,
 (f) one of said end portions being movable into sealing engagement with said sealing ring and then movable further relative to said sealing ring into abutting engagement with said abutment means at one end of said stroke.
2. In a power unit
 (a) a cylinder
 (b) a piston reciprocable in said cylinder through a predetermined stroke,
 (c) said piston having two end portions
 (d) an annular sealing ring in one end of said cylinder,
 (e) said ring having an outwardly sloping inner face facing into said cylinder, and
 (f) abutment means within said ring,
 (g) one of said end portions being movable into engagement with said face substantially entirely around the latter and then movable further along said face relative to said ring into abutting engagement with said abutment means at one end of said stroke.
3. In a power unit
 (a) a cylinder having abutment means at one end thereof,
 (b) an annular sealing ring
  (1) mounted on said abutment means, and
  (2) having an outwardly sloping inner face projecting from said abutment means generally toward the other end of said cylinder, and
 (c) a piston reciprocable in said cylinder,
 (d) said piston
  (1) having an annular portion defining the periphery of one face portion, and
  (2) being movable in said cylinder from said other end toward said one end
   (a') into position wherein said annular portion is disposed in sealing engagement with said inner face with said one face disposed in spaced relation from said abutment means, and said sealing ring disposed in operative engagement with said abutment means effective to hold said sealing ring against axial movement away from said piston, and
   (b') then into position wherein said one face is disposed in abutting engagement with said abutment means.
4. In a power unit
 (a) a cylinder having abutment means at one end thereof,
 (b) an annular sealing ring
  (1) mounted on said abutment means, and
  (2) having an outwardly sloping inner face projecting from said abutment means into said cylinder, and
 (c) a piston reciprocable in said cylinder,
 (d) said piston
  (1) having
   (a') an annular outer side wall portion, and
   (b') one end face portion disposed transversely to said side wall portion and connected to said side wall portion along an annular corner portion,
 (e) said piston being movable in said cylinder toward said abutment means
  (1) into position wherein said corner portion is disposed in continuous sealing engagement with said inner face and said end face is disposed in spaced relation to said abutment means, and
  (2) then further along said inner face relative to said sealing ring into position wherein said end face is disposed in abutting engagement with said abutment means.
5. The combination as defined in claim 4, and in which
 (a) said end face has an annular edge portion projecting axially beyond said corner portion.
6. he combination as defined in claim 4, and in which
 (a) said end face has an annular edge portion projecting axially beyond said corner portion and sloping inwardly from said side wall portion at an acute angle.
7. The combination as defined in claim 6, and in which
 (a) said end face has
  (1) an annular recess disposed therein inwardly of said annular edge portion and concentric thereto, and
  (2) a recess therein extending between said annular recess and said annular edge portion.
8. In a power unit
 (a) a cylinder having abutment means at one end thereof,
 (b) an annular sealing ring
  (1) mounted on said abutment means, and

(2) having an outwardly sloping inner face projecting from said abutment means into said cylinder, and
(c) a piston reciprocable in said cylinder,
(d) said piston
   (1) having
      (a′) an annular outer side wall portion, and
      (b′) an end face portion projecting radially inwardly of said side wall portion and connected to said side wall portion along an annular corner portion,
(e) said end face portion having
   (1) an annular outer edge portion, and
   (2) an inner portion projecting inwardly from the latter,
(f) said inner portion being disposed at one predetermined angle to said side wall portion,
(g) said annular outer edge portion projecting inwardly from said side wall portion at a second angle to the straight line extension of said side wall portion,
(h) said inner face being disposed at an outwardly projecting acute angle to said side wall portion,
(i) said piston being movable in said cylinder toward said abutment means
   (1) into position wherein said corner portion is disposed in continuous sealing engagement with said inner face and said end face is disposed in spaced relation to said abutment means, and
   (2) then further along said inner face relative to said sealing ring into position wherein said end face is disposed in abutting engagement with said abutment means.

9. The combination as defined in claim 8, and in which
(a) said second angle is an acute angle not less than one-half degree greater than said first-mentioned acute agle.

10. The combination as defined in claim 9, and in which
(a) said one angle is substantially ninety degrees.

11. The combination as defined in claim 8, and in which
(a) said second angle is an acute angle not less than one-half degree greater than said first-mentioned acute angle and is not more than ten degrees greater than said first mentioned acute angle.

12. The combination as defined in claim 8, and in which
(a) said acute angle is not less than three degrees and
(b) the distance said piston moves axially of said sealing ring in said movement along said inner face is not less than twenty-thousandths of an inch.

13. The combination as defined in claim 12, and in which
(a) said second angle is an acute angle not less than one-half degree greater than said first-mentioned acute angle and is not more than ten degrees greater than said first mentioned acute angle, and
(b) said corner portion and said sealing ring are steel.

14. In a power unit embodying a supporting member, and a cylinder projecting from said supporting member,
(a) a piston reciprocable in said cylinder through a predetermined stroke,
(b) a retainer ring
   (1) mounted on a portion of said supporting member adjacent one end of said stroke, and
   (2) having an annular, radially outwardly projecting flange disposed in spaced relation to said supporting member,
(c) a sealing ring having
   (1) an annular, radially inwardly projecting flange, and
   (2) a substantially frusto-conical shaped inner face sloping outwardly away from said last-mentioned flange and from said supporting member into said cylinder,
(d) said last-mentioned flange being disposed between said flange on said retainer ring and said supporting member in position to hold said sealing ring on said supporting member,
(e) said piston being movable through said stroke
   (1) into position to sealingly engage said inner face entirely around the latter with said piston disposed in spaced relation to said retainer ring, and
   (2) then further along said inner face into abutting engagement with said retainer ring.

15. The combination defined in claim 14, and in which
(a) said retainer ring is threaded into said supporting member.

16. The combination defined in claim 15, and which includes
(a) elongated means extending through said retainer ring into said supporting member on the side of said retainer ring remote from said cylinder for holding said retainer ring against rotation in said supporting member.

17. The combination defined in claim 14, and in which
(a) said piston has a predetermined thickness along the direction of its stroke, and
(b) said cylinder is disposed adjacent to but spaced from the location of sealing engagement of said piston with the inner face of said sealing ring by a distance less than said predetermined distance to define an opening therebetween.

18. The combination defined in claim 17, and which includes
(a) a chamber disposed in said supporting member between said portion thereof and said cylinder in fluid communication with said opening.

19. The combination defined in claim 18, and in which
(a) said retainer ring includes a passageway connecting the portion thereof adapted to abut said piston with the atmosphere.

References Cited by the Examiner
UNITED STATES PATENTS

| | | | |
|---|---|---|---|
| 1,903,775 | 4/33 | Christopher. | |
| 2,882,869 | 4/59 | Kropf | 91—396 |
| 3,027,875 | 4/62 | Spencer | 91—447 |

FRED E. ENGELTHALER, *Primary Examiner.*
SAMUEL LEVINE, *Examiner.*

UNITED STATES PATENT OFFICE
CERTIFICATE OF CORRECTION

Patent No. 3,200,715

August 17, 1965

Jack B. Ottestad

It is hereby certified that error appears in the above numbered patent requiring correction and that the said Letters Patent should read as corrected below.

Column 5, line 15, for "positions" read -- portions --; column 8, line 58, for "he" read -- The --.

Signed and sealed this 10th day of January 1967.

(SEAL)
Attest:

ERNEST W. SWIDER
Attesting Officer

EDWARD J. BRENNER
Commissioner of Patents